March 5, 1940.  T. R. McGOWAN  2,192,270
BRAKE RIGGING
Filed May 25, 1938  4 Sheets-Sheet 1
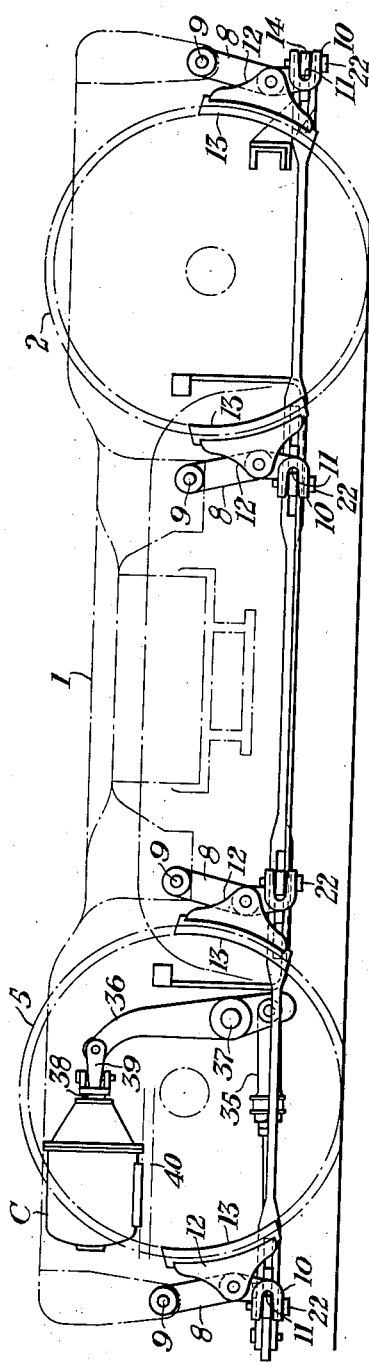
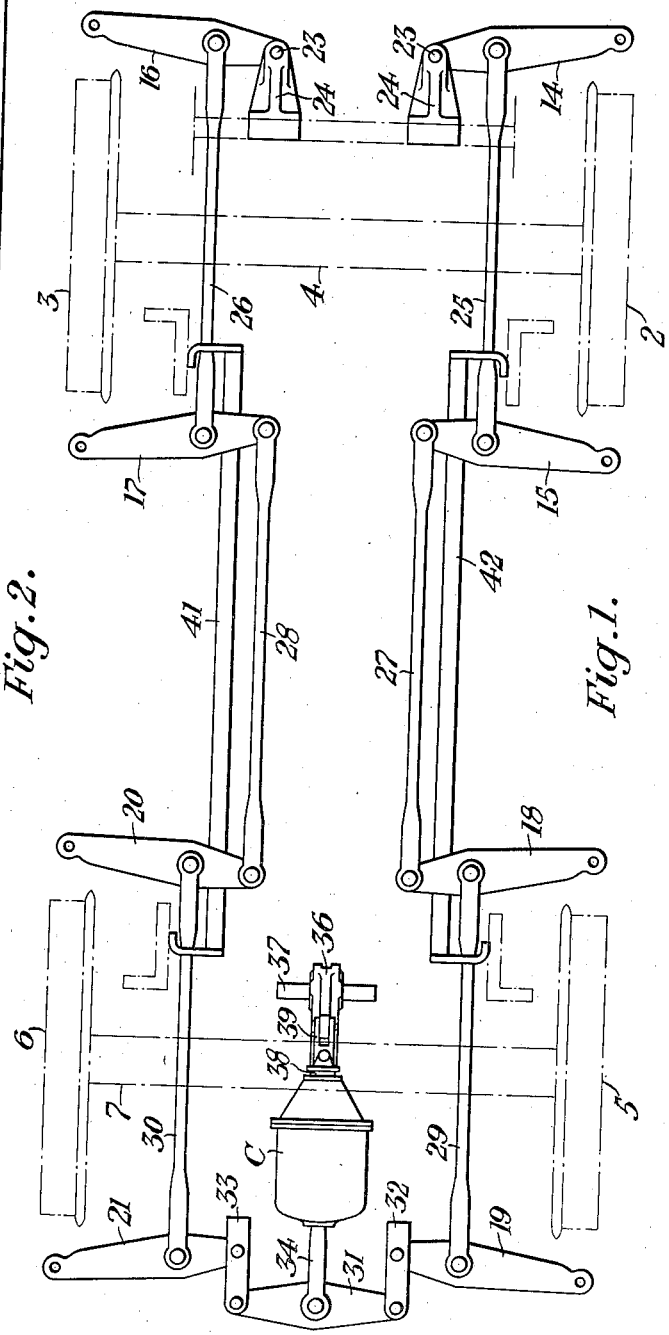
INVENTOR
Thomas R. McGowan.
BY
HIS ATTORNEY

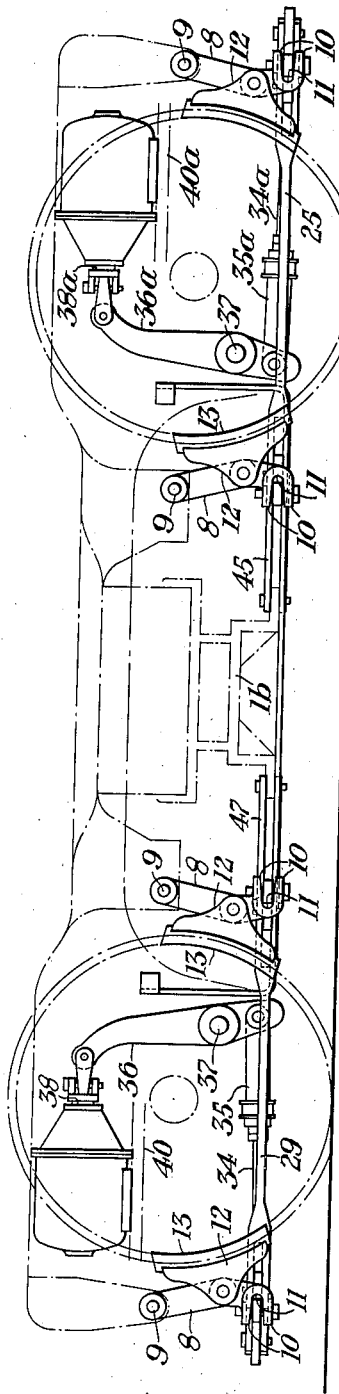
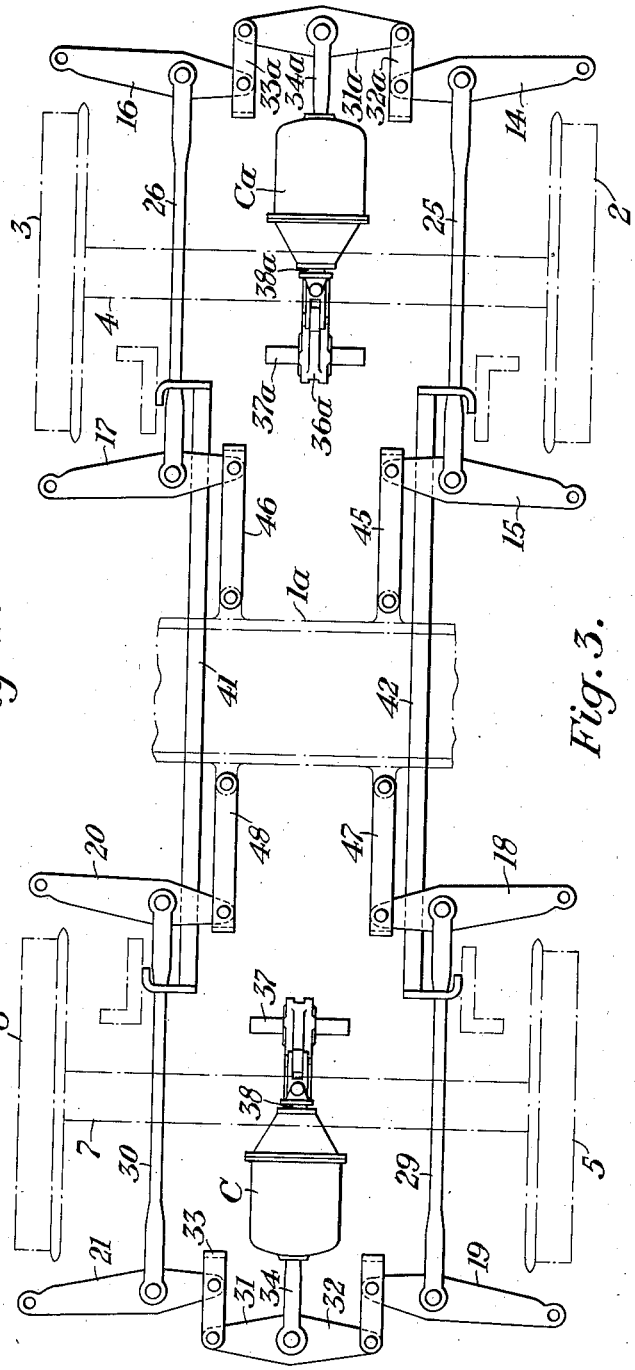

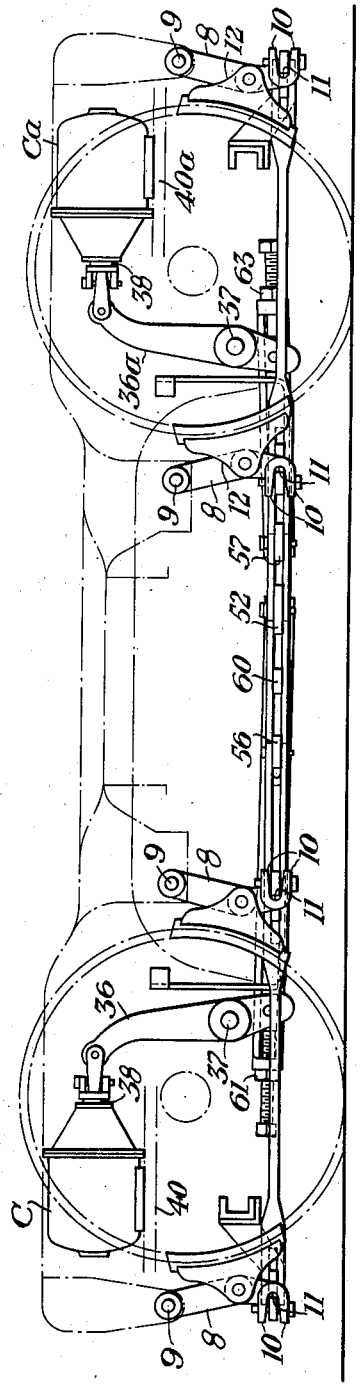

March 5, 1940.	T. R. McGOWAN	2,192,270
BRAKE RIGGING
Filed May 25, 1938	4 Sheets-Sheet 4
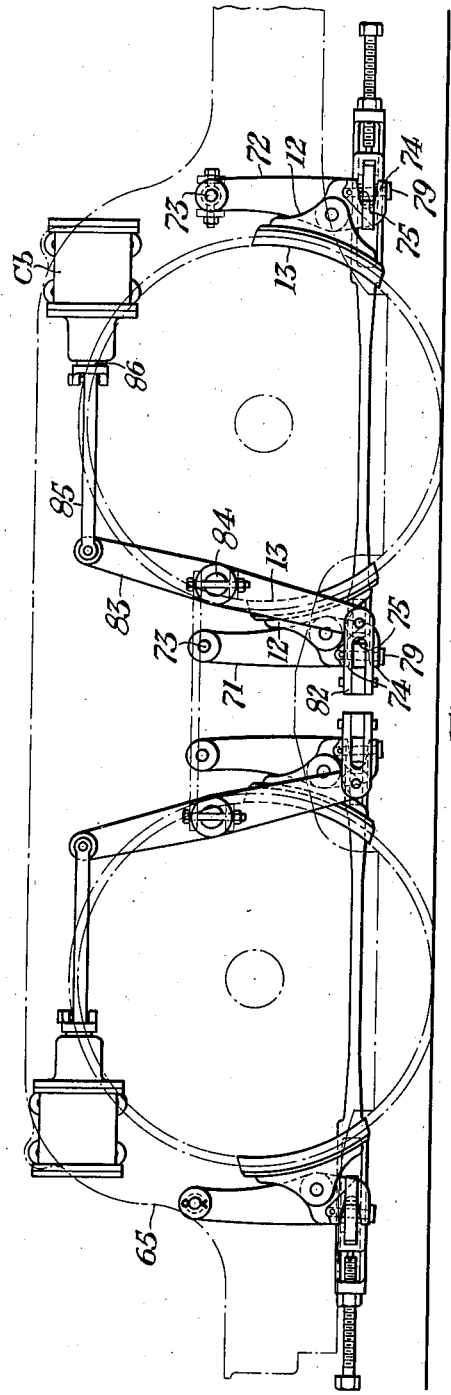
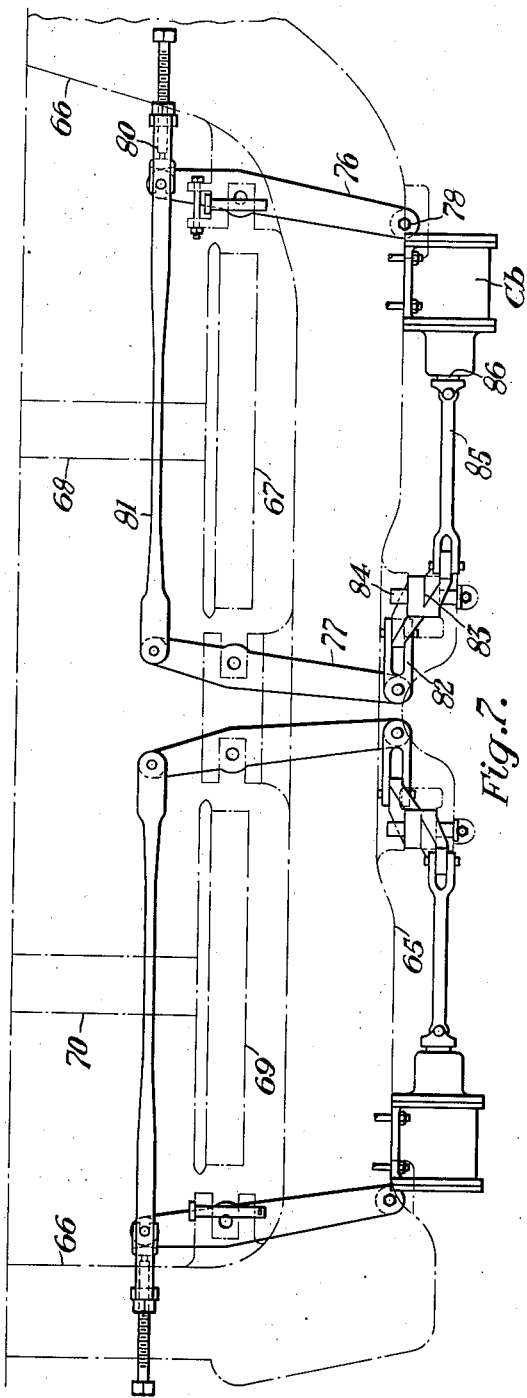
INVENTOR
Thomas R. McGowan.
BY
HIS ATTORNEY Patented Mar. 5, 1940

2,192,270

UNITED STATES PATENT OFFICE 2,192,270

BRAKE RIGGING

Thomas R. McGowan, Pittsburgh, Pa., assignor to The American Brake Company, Swissvale, Pa., a corporation of Missouri Application May 25, 1938, Serial No. 209,936

4 Claims. (Cl. 188—56)

My invention relates to brake rigging for railway vehicles, and particularly to brake rigging for locomotives wherein brake shoes are applied to both sides of each wheel.

One object of my invention is to provide a brake rigging of the type described having a minimum number of operating parts, and having these parts so located with respect to the adjacent parts of the vehicle as to permit the proper movement of the various parts of the rigging without interference with or by the adjacent parts of the vehicle.

Another object of my invention is to provide a suitable form of brake rigging for applying clasp brakes to a four wheel pony or trailer truck of a locomotive.

Other objects and characteristic features of my invention will appear as the description proceeds.

I shall describe several forms of brake rigging embodying my invention, and shall then point out the novel features thereof in claims.

In the accompanying drawings, Fig. 1 is a top plan view showing brake rigging embodying my invention applied to a four wheel engine truck, the usual hanger levers, brake heads and brake shoes being omitted to simplify and clarify the drawings. Fig. 2 is a side elevational view of the truck frame and brake rigging shown in Fig. 1. Figs. 3 and 4 are top plan and side elevational views respectively showing another form of brake rigging embodying my invention applied to a four wheel engine truck. Figs. 5 and 6 are top plan and side elevational views respectively showing still another form of brake rigging embodying my invention applied to a four wheel engine truck. Fig. 7 is a top plan view of one-half of a locomotive trailer truck having a further form of brake rigging embodying my invention applied thereto. Fig. 8 is a side elevational view of the truck and brake rigging shown in Fig. 7.

Similar reference characters refer to similar parts in each of the several views.

Referring first to Figs. 1 and 2, I have here shown brake rigging embodying my invention applied to a locomotive four wheel pony truck comprising a truck frame 1 supported at its forward end by a wheel and axle assembly consisting of a pair of wheels 2 and 3 mounted on an axle 4, and at its rear end on a wheel and axle assembly comprising a pair of wheels 5 and 6 mounted on an axle 7.

Disposed on each side of each wheel is a hanger lever 8, the upper end of which is pivotally attached to the truck frame by means of a pin 9, and the lower end of which is provided with spaced jaws 10 which form a recess 11. A brake head 12 is pivotally attached to each hanger lever intermediate its ends, and each brake head carries a brake shoe 13 for engagement with the tread of the associated wheel.

The hanger levers 8 are arranged to be simultaneously moved toward the wheels to effect a brake application by means of four pairs of horizontal laterally extending levers 14 15, 16 17, 18 19, 20 and 21, one pair of which is associated with each of the wheels 2, 3, 5 and 6 in the order named, the two levers of each pair being disposed at opposite sides of the associated wheel in such positions that the outer end of each of these levers extends into the recess 11 in an associated one of the hanger levers. The horizontal levers are supported at their outer ends by the hanger levers, and each horizontal levers is secured to the associated hanger lever by means of a pin 22 which extends through registered openings formed in the horizontal lever and in the jaws 10 of the hanger lever.

The two horizontal levers 14 and 16 which are disposed at the forward sides of the wheels 2 and 3 are dead levers, and each of these levers is pivotally connected at its inner end to the truck frame by means of a pin 23 mounted in a bracket 24. The remaining horizontal levers 15, 17, 18, 19, 20 and 21 are all live levers, and the two levers 15 and 17 which are disposed at the rear sides of the wheels 2 and 3 are connected intermediate their ends with the levers 14 and 16 intermediate their ends by means of pull rods 25 and 26, respectively, and at their inner ends with the inner ends of the levers 18 and 20 by means of pull rods 27 and 28, respectively. The levers 18 and 20, in turn, are connected intermediate their ends with the levers 19 and 21, respectively, intermediate their ends, by means of pull rods 29 and 30 similar to the pull rods 25 and 26, and at their outer ends with the opposite ends of an equalizing lever 31 by means of strap links 32 and 33.

The equalizing lever 31 is pivotally connected intermediate its ends with one end of a push rod 34, the other end of which is connected through the medium of a slack adjuster 35 of well-known construction with the lower end of a brake cylinder lever 36. The brake cylinder lever is pivotally supported intermediate its ends on a pin 37 mounted in suitable supports (not shown) provided on the truck frame, and is operatively connected at its upper end with the push rod 38 of a brake cylinder C by means of a double jaw 39. The brake cylinder C is conveniently mounted on a horizontal supporting member 40 which is provided on the truck frame a little above and to the rear of the center of the axle 7. The brake cylinder is of the usual type, and includes the usual cylinder portion (not shown), return spring (not shown), and push rod 38 operated by the piston.

The levers 17 and 20 are supported at their inner ends by means of a lever support 41 which is suspended from the truck frame, and the levers 15 and 18 are similarly supported at their inner ends by means of a lever support 42 which is suspended from the truck frame.

In operation, when fluid under pressure is supplied to the brake cylinder C, the push rod 38 is forced outwardly in the cylinder, and this outward movement of the push rod acts through the brake cylinder lever 36, push rod 34, equalizing lever 31, links 32 and 33, horizontal levers 19 and 21, the pull rods 29 and 30, horizontal levers 18 and 20, pull rods 27 and 28, horizontal levers 15 and 17, pull rods 25 and 26, and horizontal levers 14 and 16 to move the hanger levers 8 toward the wheels, and thus force the brake shoes 13 into frictional engagement with the wheels in a manner to provide an equalized braking force on each side of each wheel.

To release the brakes, the fluid which was supplied to the brake cylinder C to apply the brakes is vented from the brake cylinder in the usual manner, whereupon the release springs disposed within the brake cylinder act to move the hanger levers, and hence the brake shoes, to their released positions.

One advantage of brake mechanism constructed in the manner just described is that a minimum number of different kinds of parts is required, which enables the brake mechanism to be manufactured at a minimum cost.

Another advantage of brake mechanism constructed in the manner described is that it is extremely light in weight, and all the parts can be mounted where they are free from interference with or from adjacent parts of the locomotive.

Referring now to Figs. 3 and 4, in the modified form of the brake mechanism here shown, the horizontal levers 15, 17, 18 and 20, instead of being live levers, and being connected together at their inner ends by means of the pull rods 27 and 28 in the manner shown in Fig. 1, are dead levers, and are each pivotally attached at their inner ends to the bolster 1a of the truck frame by means of strap links 45, 46, 47 and 48, respectively. Furthermore, the horizontal levers 14 and 16, instead of being dead levers, are live levers, and are operatively connected at their inner ends with the push rod 38a of a fluid pressure motor Ca through the medium of strap links 32a and 33a, an equalizing lever 31a, a push rod 34a provided at one end with a slack adjuster 35a, and a brake cylinder lever 36a, all of which parts are similar to the corresponding parts which connect the levers 19 and 21 with the push rod 38 of the motor C. The fluid pressure motor Ca is likewise similar to the motor C, and is mounted on a horizontal supporting member 40a which is provided on the truck frame a little above and to the front of the axle 4. The remainder of the apparatus shown in Figs. 3 and 4 is similar to that shown in Figs. 1 and 2.

With the construction just described, it will be noted that two separate sets of interconnected rods and levers are provided, one for actuating the brake shoes associated with the forward pair of wheels, and the other for actuating the brake shoes associated with the rear pair of wheels. It will also be noted that each set of interconnected rods and levers is actuated by an associated brake cylinder which is disposed at the same end of the truck as the wheels to which it applies the brakes.

When it is desired to apply the brakes, fluid is simultaneously supplied to both brake cylinders C and Ca through the usual air brake control means, thereby causing the pistons of these cylinders to simultaneously move outwardly and simultaneously move the associated push rods outwardly. The outward movement of the push rod 38 will act through the associated linkage to apply the brakes to the wheels 5 and 6 in an obvious manner, and the outward movement of the push rod 38a will likewise act through the associated linkage to apply the brakes to the wheels 2 and 3.

To release the brakes, the fluid which was previously supplied to the brake cylinders C and Ca is vented to atmosphere in the usual manner, thereby permitting the release springs within the brake cylinders to retract the pistons, and hence permitting the various parts of the brake rigging to move to their released positions.

One advantage of the brake rigging shown in Figs. 3 and 4 is that the parts associated with both pairs of wheels may be of identical construction.

Another advantage of the brake rigging shown in Figs. 3 and 4 is that inasmuch as two separate sets of brakes are provided one for each pair of wheels, the failure of one set will not affect the operation of the other set.

In the modified form of the invention shown in Figs. 5 and 6, the horizontal levers 15 and 17 are operatively connected at their inner ends by means of links 50 and 51 with the opposite ends of an equalizing lever 52, and the horizontal levers 18 and 20 are operatively connected at their inner ends by means of links 54 and 55 with a crossbar 56, which crossbar, in turn, is operatively connected at points equally spaced from its ends with an equalizing lever 57 by means of links 58 and 59. The links 58 and 59 straddle the equalizing lever 52 adjacent its opposite ends, and a support 60 which is secured to the truck frame 1 in any suitable manner not shown, and serve to support the crossbar 56 and the two equalizing levers 52 and 57. The equalizing lever 52 is connected intermediate its ends with the brake cylinder lever 36 by means of a pull rod 53 and a slack adjuster 61 of well-known construction, and the equalizing lever 57 is similarly connected intermediate its ends with the brake cylinder lever 36a by means of a pull rod 62 and a slack adjuster 63 of well-known construction. The two horizontal levers 19 and 21, as here shown, are dead levers and are pivotally connected at their inner ends with the truck frame by means of pins 23a mounted in brackets 24a. The remainder of the brake rigging shown in Figs. 5 and 6 is similar to that shown in Figs. 1 and 2.

With the brake rigging arranged as shown in Figs. 5 and 6, it will be apparent that two separate sets of brake rigging are provided, one for actuating the brakes associated with the forward pair of wheels and the other for actuating the brakes associated with the rear pair of wheels, and that the brake rigging for operating the brakes associated with the rear pair of wheels is operated by the brake cylinder Ca which is located at the forward end of the truck, while the brake rigging for operating the brakes associated with the forward pair of wheels is operated by the brake cylinder C which is located at the rear end of the truck.

The operation of the brake rigging shown in Figs. 5 and 6 will be obvious from the foregoing description, and from an inspection of the drawings without further detailed description.

Referring now to Figs. 7 and 8, I have here shown brake rigging constructed in accordance with my invention applied to a four wheel trailer truck comprising spaced longitudinally extending side members 65 connected together by spaced transversely extending end members 66, only one side member being shown in the drawings. The truck frame is supported at its forward end by a wheel and axle assembly comprising a pair of wheels 67 mounted on an axle 68, and at its rear end by a wheel and axle assembly comprising a pair of wheels 69 mounted on an axle 70. The means for supporting the truck frame by the wheel and axle assemblies is not shown because these means are well-known and form no part of my present invention.

The brake rigging in the form illustrated in Figs. 7 and 8 comprises four separate sets of mechanisms, one set of which is provided for each wheel. These mechanisms are similar and it is believed, therefore, that an understanding of the entire brake rigging will be had from a description of the mechanism which is associated with one only of the wheels.

Referring particularly to the mechanism associated with the one wheel 67, for example, this mechanism comprises two hanger levers 71 and 72 which are pivotally attached at their upper ends to the truck frame by means of pins 73, and each of which is provided intermediate its ends with a brake head 12 carrying a brake shoe 13 for braking engagement with the tread of the wheels 67. The lower end of each hanger lever is provided with jaws 74 which form a recess 75.

The mechanism associated with the wheels 67 also comprises two similar horizontal laterally extending levers 76 and 77 disposed at the forward and rear sides, respectively, of the wheel 67. The lever 76 is pivotally attached at its outer end to the side member 65 by means of a pin 78, and is operatively connected intermediate its ends with the hanger lever 72 within the recess 75 by means of a pin 79 which passes through registering openings formed in the lever 76 and in the jaws 74 of the lever 72.

The inner end of the lever 76 is operatively connected through the medium of a slack adjuster 80 of the usual and well-known construction, and a pull rod 81 with the inner end of the lever 77. The lever 77 is operatively connected intermediate its ends with the hanger lever 71 in the same manner that the lever 76 is operatively connected intermediate its ends with the hanger lever 72, and is operatively connected at its outer end through the medium of a double jaw 82 with the lower end of a vertically disposed brake cylinder lever 83.

The lever 83 is pivotally supported intermediate its ends on a pin 84 secured to the side member 65 of the truck, and is operatively connected at its upper end through the medium of a push rod 85 with the push rod 86 of a brake cylinder Cb. The brake cylinder Cb may be secured to the truck frame at any suitable location, but as here shown it is secured to the outer side of the side member 65 adjacent the upper end of the side member opposite the wheel 67. The brake cylinder Cb is similar in construction to the previously described brake cylinders C and Ca.

When it is desired to apply the brakes, fluid pressure is supplied to all four brake cylinders simultaneously and the fluid supplied to the cylinder Cb forces the piston of this cylinder outwardly toward the left, as viewed in Figs. 7 and 8, and this outward movement acts through the push rods 86 and 85, brake cylinder lever 83, and double jaws 82 to move the outer end of the lever 77 toward the right as viewed in Fig. 7. The movement of the lever 77 toward the right causes the hanger lever 71 to swing toward the wheel 67 to the position in which the associated brake shoe 13 moves into engagement with the wheel, whereupon the lever rotates in a counterclockwise direction about its point of connection with the hanger lever 71 in a manner to move the pull rod 81 toward the left as viewed in Fig. 7. The movement of the pull rod 81, in turn, causes the lever 76 to rotate in a counterclockwise direction as viewed in Fig. 7 about the pin 78, and thus moves the hanger lever 72 toward the wheel 67 to the position in which the associated brake shoe 13 engages the wheel. The release of the brakes is effected through the release springs located in the brake cylinder.

One advantage of the brake rigging shown in Figs. 7 and 8 is that the brake mechanism is kept close to the frame and takes up a minimum amount of space.

Another advantage of this brake rigging is that it is of simple construction, is light in weight and requires a minimum number of different kinds of parts.

Although I have herein shown and described only a few forms of brake rigging embodying my invention, it is understood that various changes and modifications may be made therein within the scope of the appended claims without departing from the spirit and scope of my invention.

Having thus described my invention, what I claim is:

1. In a brake rigging for a four wheel truck, a pair of horizontal laterally extending levers associated with each wheel, the two levers of each pair being disposed on opposite sides of the associated wheel and being operatively connected at their outer ends with brake shoes for frictionally engaging the associated wheel, a brake cylinder secured to the truck frame at one end of the truck, and means for operatively connecting said brake cylinder with all of said levers in a manner to simultaneously actuate all of said levers in response to operation of said brake cylinder to cause the brake shoes to frictionally engage the associated wheels.

2. In a brake rigging for a four wheel truck, a pair of horizontal laterally extending levers associated with each wheel, the two levers of each pair being disposed on opposite sides of the associated wheel and being operatively connected at their outer ends with brake shoes for applying clasp breaks to the associated wheel, the two levers which are disposed at the forward sides of the forward pair of wheels being pivotally attached at their inner ends to the truck frame, a first pair of pull rods connecting the two last mentioned levers intermediate their ends with the two levers at the rear sides of the forward pair of wheels intermediate their ends, a second pair of pull rods connecting the inner ends of the levers which are disposed at the rear sides of the forward pair of wheels with the inner ends of the two levers which are disposed at the forward sides of the rear pair of wheels, a third pair of pull rods connecting the levers which are disposed at the forward sides of the rear pair of wheels intermediate their ends with the two levers which are disposed at the rear sides of the rear pair of wheels intermediate their ends, and means connected with the inner ends of the two levers which are disposed at the rear sides of the rear pair of wheels for actuating all of said levers.

3. In a brake rigging for a four wheel truck, a pair of horizontal laterally extending levers associated with each wheel, the two levers of each pair being disposed on opposite sides of the associated wheel and being operatively connected at their outer ends with brake shoes for applying clasp brakes to the associated wheel, the two levers which are disposed at the forward sides of the forward pair of wheels being pivotally attached at their inner ends to the truck frame, a first pair of pull rods connecting the two last mentioned levers intermediate their ends with the two levers at the rear sides of the forward pair of wheels intermediate their ends, a second pair of pull rods connecting the inner ends of the levers which are disposed at the rear sides of the forward pair of wheels with the inner ends of the two levers which are disposed at the forward sides of the rear pair of wheels, a third pair of pull rods connecting the levers which are disposed at the forward sides of the rear pair of wheels intermediate their ends with the two levers which are disposed at the rear sides of the rear pair of wheels intermediate their ends, an equalizing lever connected at its ends with the inner ends of the two levers which are disposed at the rear sides of the rear pair of wheels, and means connected with said equalizing lever for actuating it.

4. In a brake rigging for a four wheel truck, a pair of horizontal laterally extending levers associated with each wheel, the two levers of each pair being disposed on opposite sides of the associated wheel and being operatively connected at their outer ends with brake shoes for applying clasp brakes to the associated wheel, the two levers which are disposed at the forward sides of the forward pair of wheels being pivotally attached at their inner ends to the truck frame, a first pair of pull rods connecting the two last mentioned levers intermediate their ends with the two levers at the rear sides of the forward pair of wheels intermediate their ends, a second pair of pull rods connecting the inner ends of the levers which are disposed at the rear sides of the forward pair of wheels with the inner ends of the two levers which are disposed at the forward side of the rear pair of wheels, a third pair of pull rods connecting the levers which are disposed at the forward sides of the rear pair of wheels intermediate their ends with the two levers which are disposed at the rear sides of the rear pair of wheels intermediate their ends, a brake cylinder secured to said truck at its rear end, and means including an equalizing lever connected at its ends with the inner ends of the two levers which are disposed at the rear sides of the rear pair of wheels for operatively connecting said brake cylinder with all of said levers.

THOMAS R. McGOWAN.